(12) United States Patent
Stumpf

(10) Patent No.: US 9,316,140 B2
(45) Date of Patent: Apr. 19, 2016

(54) COOLING MODULE

(71) Applicant: Bayerische Motoren Werke Aktiengesellscahft, Munich (DE)

(72) Inventor: Stephan Stumpf, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 14/466,168

(22) Filed: Aug. 22, 2014

(65) Prior Publication Data

US 2014/0360475 A1 Dec. 11, 2014

Related U.S. Application Data

(63) Continuation of application No. PCT/EP2013/051671, filed on Jan. 29, 2013.

(30) Foreign Application Priority Data

Mar. 7, 2012 (DE) .................. 10 2012 203 608

(51) Int. Cl.
*F02M 15/00* (2006.01)
*F01P 3/18* (2006.01)
(Continued)

(52) U.S. Cl.
CPC ............... *F01P 3/18* (2013.01); *B01D 53/8675* (2013.01); *B01D 53/88* (2013.01); *F02B 29/0462* (2013.01); *F02M 25/0737* (2013.01);
(Continued)

(58) Field of Classification Search
CPC ............ F02B 29/0443; F02B 29/0475; F02B 29/0493; F02B 29/0462; F01P 2060/02
USPC .......................................................... 123/542
See application file for complete search history.

(56) References Cited

U.S. PATENT DOCUMENTS 4,236,492 A  12/1980  Tholen
6,190,627 B1 *  2/2001  Hoke et al. ............ 423/219
(Continued)

FOREIGN PATENT DOCUMENTS

CN          1205047 A     1/1999
CN        101010497 A     8/2007
(Continued)

OTHER PUBLICATIONS

International Search Report dated Jun. 7, 2013 with English translation (five (5) pages).
(Continued)

*Primary Examiner* — Lindsay Low
*Assistant Examiner* — Charles Brauch
(74) *Attorney, Agent, or Firm* — Crowell & Moring LLP

(57) ABSTRACT

A cooling module, composed of at least one first and one second heat exchanger, are connected in a common frame or directly to one another, it being possible for cooling air to flow through both heat exchangers. The second heat exchanger has a greater structural depth than the first heat exchanger in the flow direction of the cooling air. The first heat exchanger and the second heat exchanger have a catalytic coating and the second heat exchanger is composed of at least one first and one second partial heat exchanger which are arranged one behind the other in the flow direction of the cooling air and which are operatively connected to one another. By means of the configuration according to the invention, the largest possible catalytically active coating surface area is attained.

20 Claims, 1 Drawing Sheet

(51) Int. Cl.
  *B01D 53/86* (2006.01)
  *B01D 53/88* (2006.01)
  *F02M 25/07* (2006.01)
  *F28F 21/00* (2006.01)
  *F02B 29/04* (2006.01)

(52) U.S. Cl.
  CPC ......... *F28F21/00* (2013.01); *B01D 2259/4558* (2013.01); *B01D 2259/4566* (2013.01); *F01P 2003/182* (2013.01); *F01P 2003/187* (2013.01); *F01P 2060/02* (2013.01); *F02B 29/0443* (2013.01); *F02B 29/0475* (2013.01); *F02B 29/0493* (2013.01)

(56) References Cited

U.S. PATENT DOCUMENTS

| | | |
|---|---|---|
| 6,220,207 B1 | 4/2001 | Kawasaki et al. |
| 6,619,379 B1 | 9/2003 | Ambros et al. |
| 8,511,411 B2 | 8/2013 | Steller |
| 2005/0109483 A1 | 5/2005 | Kolb |
| 2005/0109484 A1 | 5/2005 | Kolb et al. |
| 2006/0231234 A1 | 10/2006 | Kalbacher |
| 2009/0217655 A1 | 9/2009 | Yabuki |

FOREIGN PATENT DOCUMENTS

| | | |
|---|---|---|
| DE | 26 55 017 A1 | 6/1978 |
| DE | 40 07 965 A1 | 9/1991 |
| DE | 199 28 193 A1 | 1/2000 |
| DE | 696 35 027 T2 | 6/2006 |
| DE | 600 22 896 T2 | 7/2006 |
| DE | 10 2005 017 252 A1 | 10/2006 |
| DE | 10 2010 011 495 A1 | 9/2011 |
| EP | 1 082 990 A2 | 3/2001 |
| WO | WO 97/11769 A1 | 4/1997 |
| WO | WO 01/91890 A1 | 12/2001 |

OTHER PUBLICATIONS

German Search Report dated Oct. 24, 2012, including English translation (ten (10) pages).

Chinese Office Action issued in counterpart Chinese Application No. 201380008551.6 dated Nov. 23, 2015 (eight (8) pages).

* cited by examiner

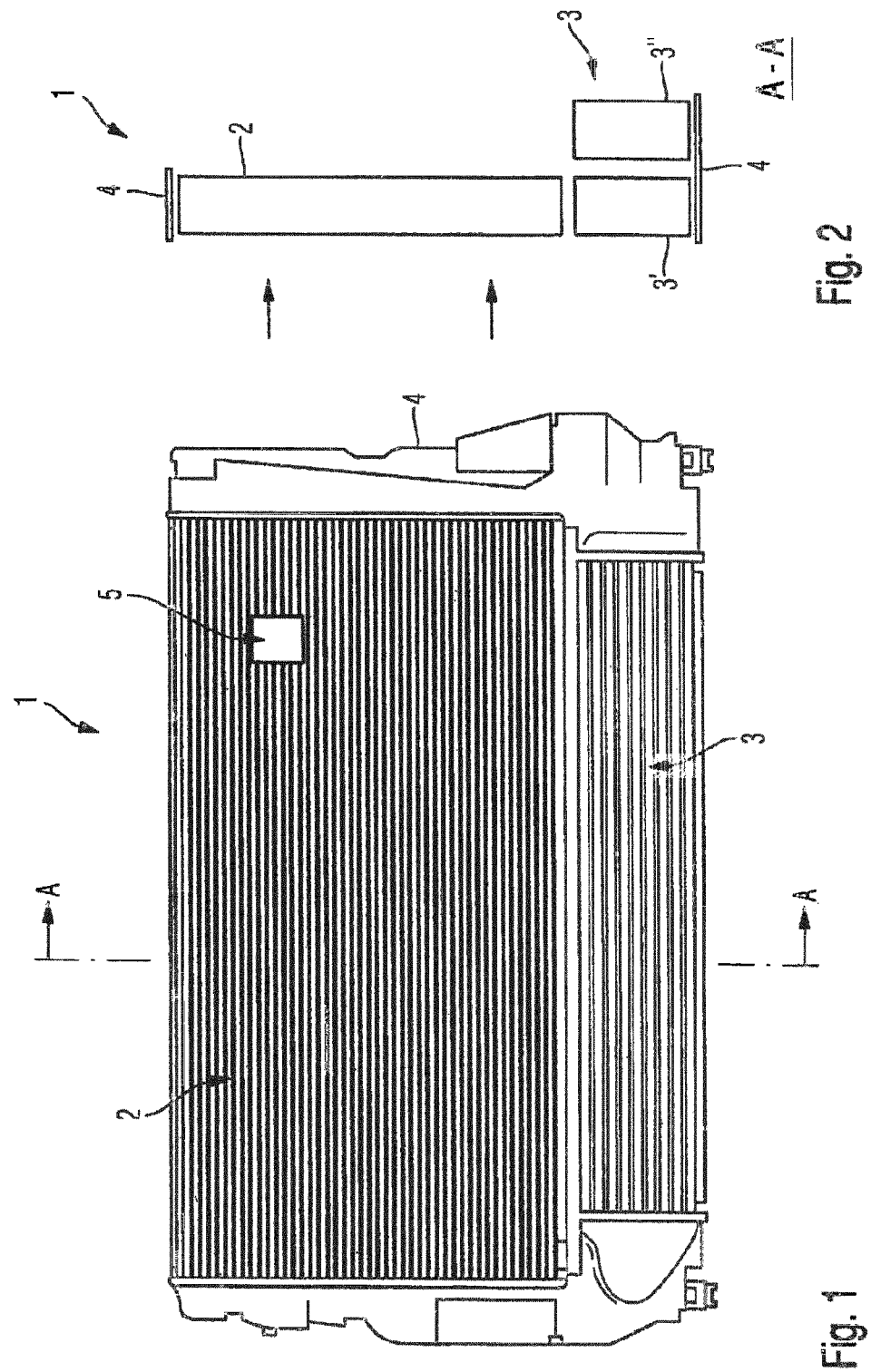

COOLING MODULE

CROSS REFERENCE TO RELATED APPLICATIONS

This application is a continuation of PCT International Application No. PCT/EP2013/051671, filed Jan. 29, 2013, which claims priority under 35 U.S.C. §119 from German Patent Application No. 10 2012 203 608.3, filed Jul. 3, 2012, the entire disclosures of which are herein expressly incorporated by reference.

BACKGROUND AND SUMMARY OF THE INVENTION

The invention relates to a cooling module composed of at least a first and a second heat exchanger, which are connected in a common frame or directly with one another, and wherein cooling air can flow through both heat exchangers. The second heat exchanger has a greater structural depth than the first heat exchanger in the flow direction of the cooling air.

A cooling module of the above-mentioned type is known, for example, from German Published Patent Application DE 10 2010 011 495 A1. From this document, on which the present invention is based, a cooling module for motor vehicles is known which has several module elements. In this case, at least a first module element and a second module element are provided in the deformation area of the motor vehicle. The module element is characterized in that at least a first module element can be displaced with respect to the at least second module element.

For SULEV (Super Ultra Low Emission Vehicle) licenses in the automobile industry, up to now, exclusively a single heat exchanger—the coolant cooler—with a "PremAir®" coating (BASF Co.) had been surface-coated in a catalytically effective manner. PremAir® is the name of a system for converting ground-level ozone (triatomic oxygen molecules) to oxygen (biatomic oxygen molecules), installed, for example, by Volvo between 1998 and 2005. For this purpose, the cooler was provided with the above-mentioned catalytic PremAir® coating, which splits the ozone molecules. The free oxygen radicals will then combine again to form oxygen molecules (O2).

On the basis of the U.S. legal requirements of the EPA (Environmental Protection Agency) or of the CARB (California Air Resources Board), in this case, a maximal credit of 5 mg NMOG (unburned hydrocarbons) can be reached for so-called DOR systems (Direct Ozone Reduction) when the DOR system directly converts ozone to oxygen and its function is continuously checked and protected from manipulation attempts by way of the OBD (onboard diagnosis in the vehicle).

In view of increasingly compact installation spaces and further increasing safety demands in vehicles, such as passive pedestrian protection systems for the front end of the vehicle, the front face of the heat exchangers or of the coolant cooler is reduced for newly developed vehicles such that achieving the maximally legally possible NMOG credit goal encounters its physical limits. The value of the NMOG credit to be entered is calculated from, among other things, the front face of the coated heat exchanger surface as well as the ozone conversion rate. When the two latter parameters are enlarged, the NMOG credit that can be obtained will increase. An assembled cooling module contains at least one additional heat exchanger that can be coated, such as a charge air cooler. Because of the larger overall depth, for example, of a charge air cooler, a functionally effective through-coating by means of a PremAir® coating according to the current industry standard cannot be achieved, and thus obtaining the additional NMOG credits is not possible.

It is an object of the present invention to provide a measure for avoiding the above-mentioned disadvantages.

This and other objects are achieved by a cooling module composed of at least a first and a second heat exchanger, which are connected in a common frame or directly with one another, and wherein cooling air can flow through both heat exchangers. The second heat exchanger has a greater structural depth than the first heat exchanger in the flow direction of the cooling air. The first and the second heat exchanger have a catalytic coating. The second heat exchanger is composed of at least one first and one second partial (component) heat exchanger which are arranged one behind the other in the flow direction of the cooling air and which are operatively connected with one another.

According to the invention, it is therefore provided that at least the second heat exchanger is designed such that, before final assembly, its block-type heat exchanger networks/-partial networks, can be through-coated in smaller or thinner units. This can be implemented by a block-type construction of the heat exchanger matrix which, after assembly, then resembles the final system depth. As a result, the objective of maximally possible NMOG credits can be achieved in the manner of emission credits. The reaching of the objective is therefore also ensured for future new projects with very tight installation space conditions. Advantageously, the further development according to the invention additionally results in a stability increase with respect to the aging of the coating because of the enlargement of the coated heat exchanger surface.

Preferably, the at least two partial (component) heat exchangers can be coated with the catalytic coating separately from one another in order to obtain, if possible, 100% surface coating and thereby an optimal efficiency.

In a preferred embodiment, the first heat exchanger is a radiator for an internal-combustion engine or, in a second embodiment, a condenser for a vehicle air-conditioning system.

The second heat exchanger preferably is a charge-air cooler or an exhaust gas recirculation cooler, which both have a relatively deep construction, or a low-temperature cooler, for example, for hybrid vehicles.

In a further, particularly preferred embodiment, a fluid to be cooled can flow in parallel through the at least two partial heat exchangers, and in a further embodiment, the fluid to be cooled can flow serially, i.e. successively, through the at least two partial heat exchangers.

In a particularly preferred U.S. embodiment, the first and the second heat exchanger are non-detachably mutually connected with the frame, so that a further OBD sensor for monitoring the conversion of ozone to oxygen will not be necessary. For this purpose, the first and the second heat exchanger are preferably mutually connected with the frame in a firmly bonded and/or form-fitting manner in a way that attempted disassembling of them would lead to damage to the heat exchanger.

A catalytic coating is used as a preferred coating, which catalytic coating splits the ozone molecules consisting of three oxygen atoms into oxygen molecules consisting of two oxygen atoms.

The cooling module according to the invention is particularly preferably used in motor vehicles and airplanes.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a top view of a cooling module according to an embodiment of the invention; and FIG. 2 is a schematic sectional view of the cooling module according to FIG. 1.

DETAILED DESCRIPTION OF THE DRAWINGS

In the following, the same reference numbers will be used for identical components in both drawings.

FIG. 1 is a front view of a cooling module according to an embodiment of the invention. The cooling module 1 is composed of at least a first and a second heat exchanger 2, 3, which are connected in a common frame 4 or directly with one another by way of the fluid boxes. In a known manner, cooling air can flow through both heat exchangers 2, 3. The second heat exchanger 3 has a greater structural depth than the first heat exchanger 2 in the flow direction of the cooling air.

The cooling module 1 is characterized in that the first and the second heat exchanger 2, 3 have a catalytic coating, and the second heat exchanger 3 is composed of at least one first and one second partial heat exchanger 3', 3" according to FIG. 2, which are arranged one behind the other in the flow direction of the cooling air and which are operatively connected with one another.

For constant monitoring or OBD (onboard diagnosis) of the conversion features of the catalytic coating, a sensor 5 is arranged on the surface of the first heat exchanger 2, which sensor 5 cannot be manipulated. In order to achieve maximal efficiency of the catalytic conversion, the at least two partial heat exchangers 3, 3', and 3" can be coated with the catalytic coating separately from one another over their entire depth, in order to achieve a 100% surface coating.

In two different embodiments of the further development according to the invention, the first heat exchanger 2 is provided as a radiator (coolant cooler) for an internal-combustion engine or as a condenser for an air-conditioning system of a vehicle. In two further particularly preferred embodiments, the second heat exchanger 3 is constructed as a charge-air cooler or as an exhaust-gas recirculation cooler or a low-temperature cooler.

In turn, in two further embodiments, a fluid to be cooled can flow either parallel or serially i.e. successively, through the at least two partial heat exchangers 3', 3". Corresponding to the above-mentioned configurations, the fluid to be cooled may be a coolant, a refrigerant, a charge air or an exhaust gas.

In a further particularly preferred US embodiment, the first and the second heat exchanger 2, 3 are non-detachably connected with the frame 4 or directly with one another by way of the fluid boxes. This preferably takes place by a firmly bonded and/or form-fitted connection. As a result of this measure, a second sensor 5 at the second heat exchanger 3 will not be necessary.

The catalytic coating preferably is a catalytic coating which splits ozone molecules, consisting of three oxygen atoms, which subsequently again combine as oxygen molecules consisting of two oxygen atoms.

The cooling module 1 according to the invention is particularly preferably used in motor vehicles and airplanes.

FIG. 2 is a schematic sectional view, taken during line A-A in FIG. 1, of the cooling module 1.

LIST OF REFERENCE NUMBERS

1 Cooling module
2 First heat exchanger
3 Second heat exchanger
3' First partial heat exchanger
3" Second partial heat exchanger
4 Frame
5 Sensor The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cooling module, comprising:
a first heat exchanger having a catalytic coating;
a second heat exchanger having a catalytic coating, cooling air being flowable through both the first and the second heat exchanger, wherein
the first and the second heat exchanger are connected in a common frame or directly with one another, and
the second heat exchanger has a greater structural depth in the flow direction of the cooling air from an upstream side to a downstream side of the second heat exchanger than the first heat exchanger, the second heat exchanger comprising at least one first and one second partial heat exchanger which are arranged one behind the other in the flow direction of the cooling air and which are operatively connected with one another.

2. The cooling module according to claim 1, wherein the first and the second partial heat exchangers are coated with the catalytic coating separately from one another.

3. The cooling module according to claim 1, wherein the first heat exchanger is a radiator for an internal combustion engine or a condenser for an air-conditioning system of a vehicle.

4. The cooling module according to claim 2, wherein the first heat exchanger is a radiator for an internal combustion engine or a condenser for an air-conditioning system of a vehicle.

5. The cooling module according to claim 1, wherein the second heat exchanger is a charge-air cooler, an exhaust gas recirculation cooler or a low-temperature cooler.

6. The cooling module according to claim 3, wherein the second heat exchanger is a charge-air cooler, an exhaust gas recirculation cooler or a low-temperature cooler.

7. The cooling module according to claim 1, wherein a fluid coolable via the cooling module flows in parallel or serially through the first and second partial heat exchangers.

8. The cooling module according to claim 2, wherein a fluid coolable via the cooling module flows in parallel or serially through the first and second partial heat exchangers.

9. The cooling module according to claim 1, wherein the first and the second heat exchanger are non-detachably connected with the frame or directly with one another.

10. The cooling module according to claim 6, wherein the first and the second heat exchanger are non-detachably connected with the frame or directly with one another.

11. The cooling module according to claim 9, wherein the first and the second heat exchanger are mutually connected with the frame in a firmly bonded and/or form-fitting manner.

12. The cooling module according to claim 1, wherein the catalytic coating of the first and the second heat exchanger is one that splits ozone molecules comprising three oxygen atoms.

13. A motor vehicle, comprising:
a cooling module arranged in the motor vehicle, the cooling module comprising:
a first heat exchanger having a catalytic coating;
a second heat exchanger having a catalytic coating, cooling air being flowable through both the first and the second heat exchanger, wherein
the first and the second heat exchanger are connected in a common frame or directly with one another, and
the second heat exchanger has a greater structural depth in the flow direction of the cooling air from an upstream side to a downstream side than the first heat exchanger, the second heat exchanger comprising at least one first and one second partial heat exchanger which are arranged one behind the other in the flow direction of the cooling air and which are operatively connected with one another.

14. The cooling module according to claim 13, wherein the first and the second partial heat exchangers are coated with the catalytic coating separately from one another.

15. The cooling module according to claim 14, wherein the first heat exchanger is a radiator for an internal combustion engine or a condenser for an air-conditioning system of a vehicle.

16. The cooling module according to claim 15, wherein the second heat exchanger is a charge-air cooler, an exhaust gas recirculation cooler or a low-temperature cooler.

17. The cooling module according to claim 16, wherein a fluid coolable via the cooling module flows in parallel or serially through the first and second partial heat exchangers.

18. The cooling module according to claim 17, wherein the first and the second heat exchanger are non-detachably connected with the frame or directly with one another.

19. The cooling module according to claim 18, wherein the first and the second heat exchanger are mutually connected with the frame in a firmly bonded and/or form-fitting manner.

20. The cooling module according to claim 19, wherein the catalytic coating of the first and the second heat exchanger is one that splits ozone molecules comprising three oxygen atoms.

\* \* \* \* \*